United States Patent
Kimura et al.

(10) Patent No.: US 12,381,017 B2
(45) Date of Patent: Aug. 5, 2025

(54) CONDUCTIVE PASTE FOR ELECTRODE FORMATION

(71) Applicant: KYOCERA Corporation, Kyoto (JP)

(72) Inventors: Tetsuya Kimura, Aira (JP); Nihiro Utsumi, Kirishima (JP); Yusuke Azuma, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/580,481

(22) PCT Filed: Jul. 14, 2022

(86) PCT No.: PCT/JP2022/027762
§ 371 (c)(1),
(2) Date: Jan. 18, 2024

(87) PCT Pub. No.: WO2023/002921
PCT Pub. Date: Jan. 26, 2023

(65) Prior Publication Data
US 2024/0321478 A1 Sep. 26, 2024

(30) Foreign Application Priority Data
Jul. 21, 2021 (JP) .................................. 2021-120884

(51) Int. Cl.
*H01B 1/22* (2006.01)
*H01G 4/008* (2006.01)
*H01G 4/30* (2006.01)

(52) U.S. Cl.
CPC .............. *H01B 1/22* (2013.01); *H01G 4/008* (2013.01); *H01G 4/30* (2013.01)

(58) Field of Classification Search
CPC . H01B 1/22; C09D 5/24; H01G 4/008; H01G 4/012
See application file for complete search history.

(56) References Cited

U.S. PATENT DOCUMENTS

| | | | | |
|---|---|---|---|---|
| 7,083,744 B2 * | 8/2006 | Matsuno | .............. | H01G 4/2325 252/512 |
| 7,282,163 B2 * | 10/2007 | Tanaka | ............. | H01C 17/06533 252/518.1 |
| 7,494,607 B2 * | 2/2009 | Wang | .................... | C03C 14/006 252/514 |

(Continued)

FOREIGN PATENT DOCUMENTS

| JP | 5-55077 A | 3/1993 |
|---|---|---|
| JP | 08-102426 A | 4/1996 |

(Continued)

OTHER PUBLICATIONS

English translation of PCT/ISA/237 (mailed Oct. 2022).*

(Continued)

*Primary Examiner* — Mark Kopec
(74) *Attorney, Agent, or Firm* — Volpe Koenig

(57) ABSTRACT

A conductive paste for electrode formation contains metal particles, a binder, a metal oxide additive, and a solvent. The metal oxide additive includes a metal oxide having, in an Ellingham diagram, a higher level of standard Gibbs energy of formation than carbon dioxide or carbon monoxide at a temperature of 500 to 1000° C.

7 Claims, 1 Drawing Sheet

(56) References Cited

U.S. PATENT DOCUMENTS

| | | | |
|---|---|---|---|
| 7,544,314 B2* | 6/2009 | Tanaka | C03C 8/14 |
| | | | 252/514 |
| 8,936,737 B2* | 1/2015 | Kim | H10N 30/871 |
| | | | 427/58 |
| 2008/0186655 A1 | 8/2008 | Kawamoto | |
| 2018/0012702 A1 | 1/2018 | Azuma et al. | |
| 2020/0262741 A1* | 8/2020 | Jang | C03C 8/10 |

FOREIGN PATENT DOCUMENTS

| | | |
|---|---|---|
| JP | 2014-093142 A | 5/2014 |
| WO | 2007/139061 A1 | 12/2007 |
| WO | 2016/121745 A1 | 8/2016 |

OTHER PUBLICATIONS

Zou et al "Enhanced adhesion strength of silver paste on AlN ceramic substrate via sintered nano-CuO", Ceramics International 47 (2021) 9471-9476 (available online Dec. 2020).*

* cited by examiner

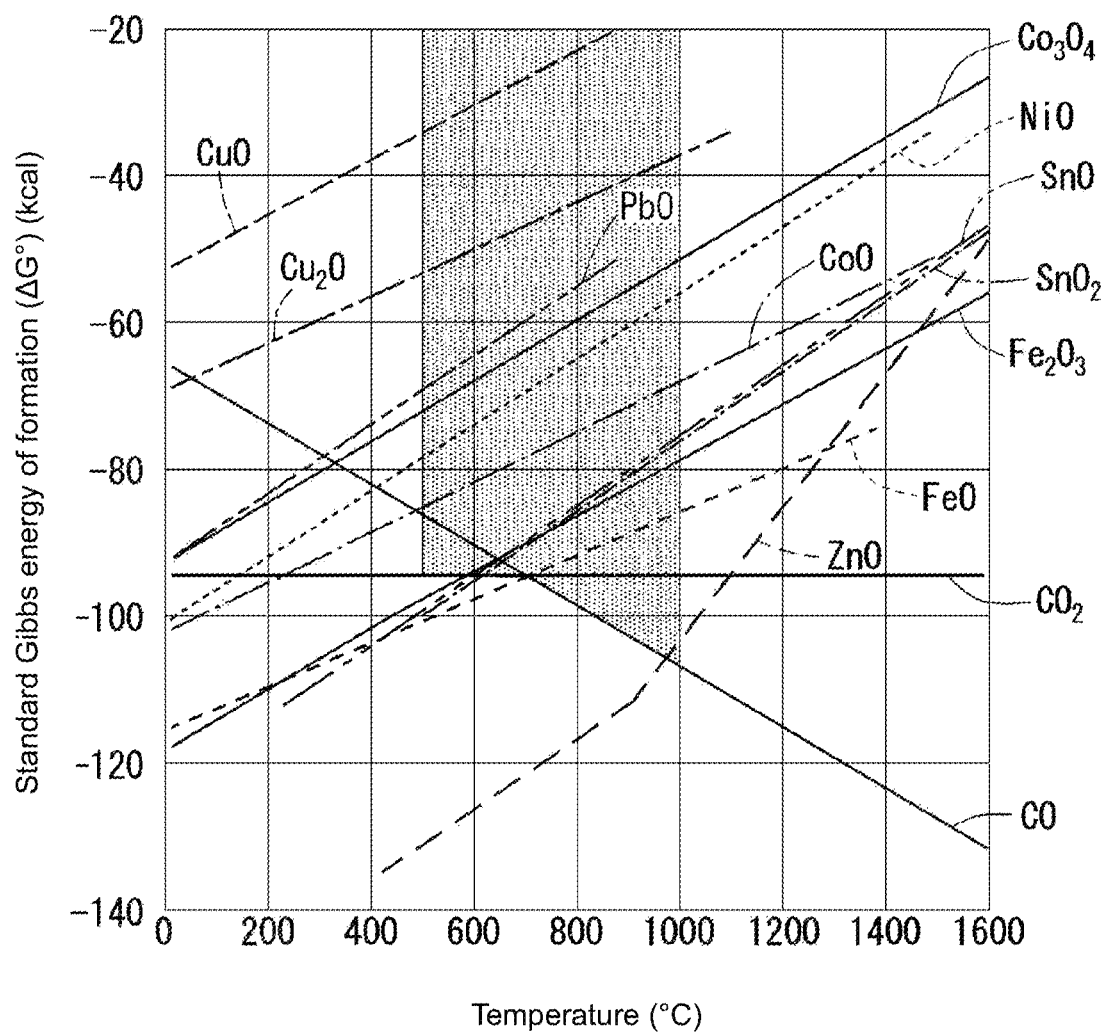

CONDUCTIVE PASTE FOR ELECTRODE FORMATION

TECHNICAL FIELD

The present disclosure relates to a conductive paste for electrode formation.

BACKGROUND OF INVENTION

A known technique is described in, for example, Patent Literature 1.

CITATION LIST

Patent Literature

Patent Literature 1: WO 2016/121745

SUMMARY

In an aspect of the present disclosure, a conductive paste for electrode formation contains metal particles, a binder, a metal oxide additive, and a solvent. The metal oxide additive includes a metal oxide having, in an Ellingham diagram, a higher level of standard Gibbs energy of formation than carbon dioxide or carbon monoxide at a temperature of 500 to 1000° C.

BRIEF DESCRIPTION OF THE DRAWINGS

The drawing is an Ellingham diagram.

DESCRIPTION OF EMBODIMENTS

The objects, features, and advantages of the present disclosure will become more apparent from the following detailed description and the drawings.

A ceramic capacitor with the structure that forms the basis of the present disclosure includes ceramic layers and internal electrode layers alternately stacked on one another as described in, for example, Patent Literature 1.

A multilayer ceramic capacitor is obtained by printing an electrode pattern on the surface of unfired dielectric tape with a conductive paste, stacking multiple layers of the tape, and then firing the stack.

The trend toward miniaturization of electronic devices such as smartphones facilitates miniaturization of multilayer ceramic capacitors, causing each dielectric layer to be thinner. To maintain the strength of the unfired dielectric tape in the thinner layers, the content of a binder is to be higher or the binder is to have a higher molecular weight. The conductive paste for electrode formation is also to have a higher content of a binder or contain a binder with a higher molecular weight to, for example, increase viscosity for printing for thin layers, to increase the strength of the dielectric tape with the conductive paste printed, and to improve adhesion during stacking.

The binder in the conductive paste is burned by heating in a debinding step. When the content of the binder is increased or the binder has a higher molecular weight, the heating may be performed at an increased temperature or for an extended period of time for sufficient combustion. The resulting oversintering or oxidation of metal particles left as an electrode may reduce the static capacity of the multilayer ceramic capacitors.

One or more aspects of the present disclosure are directed to a conductive paste for electrode formation that allows miniaturization of multilayer ceramic capacitors.

A conductive paste for electrode formation according to one or more embodiments of the present disclosure will now be described in detail. The conductive paste for electrode formation according to one or more embodiments of the present disclosure is not limited to the specific embodiments described below.

In the present embodiment, a conductive paste for electrode formation contains metal particles, a binder, a metal oxide additive, and a solvent. The metal oxide additive contains a metal oxide that has, in an Ellingham diagram, a higher level of standard Gibbs energy of formation than carbon dioxide or carbon monoxide at a temperature of 500 to 1000° C.

Metal Particles

The metal particles are conductive and a metal element in a particulate form or in a powder form. The metal element may be, for example, a metal element known as a material for electrodes for multilayer ceramic capacitors. The metal element may be, for example, a base metal element. Examples of the base metal element include nickel, copper, cobalt, iron, tin, and zinc.

The metal particles may be in a particulate form or in a powder form and may be in any shape. For example, the metal particles may be spherical, needle-shaped, or irregularly shaped. The mean particle size of the metal particles may be, for example, 50 to 300 nm, or specifically, 100 to 250 nm. The mean particle size is calculated using image analysis software (ImageJ) based on an image of the metal particles (200 to 300 particles) captured with a scanning electron microscope (SEM).

The content (a solid content) of the metal particles may be, for example, 20 to 70 mass %, or specifically, 30 to 60 mass %, of the entire conductive paste for electrode formation.

Binder

The binder may be a known resin component used for conductive pastes for electrode formation. The binder is a resin component used for miniaturizing multilayer ceramic capacitors. The content of the binder in the conductive paste for electrode formation may be higher than in known conductive pastes. The binder may be a resin with a high molecular weight. To form thinner electrode layers in a multilayer ceramic capacitor, the conductive paste for electrode formation is to be thinner when printed. A high content of a high-molecular-weight binder increases the viscosity of the conductive paste for electrode formation for printing for forming thin layers. A high content of a high-molecular-weight binder also increases the strength of the dielectric tape on which the conductive paste for electrode formation is printed.

Examples of the binder include celluloses, such as ethyl cellulose and nitrocellulose, an acrylic resin, a phenolic resin, an alkyd resin, a styrene resin, a rosin ester, and polyvinyl butyral. The binder may be ethyl cellulose or polyvinyl butyral with a relatively high molecular weight for thinner layers. One such binder may be used alone, or a mixture of two or more different binders may be used.

Although the content of the binder varies depending on the resin component used, the content of the binder is substantially 0.5 to 20 mass % inclusive of the metal particles. For the binder being ethyl cellulose, the content may be, for example, 2.5 to 10 mass % inclusive of the metal particles. For the binder being polyvinyl butyral, the content may be, for example, 0.5 to 10 mass % inclusive of the metal particles.

Metal Oxide Additive

The metal oxide additive accelerates the oxidation of the binder in the conductive paste for electrode formation. The metal oxide additive includes a metal oxide. The metal oxide has, in the Ellingham diagram, a higher level of standard Gibbs energy of formation than carbon dioxide or carbon monoxide at a temperature of 500 to 1000° C. The binder in the conductive paste for electrode formation is burned by heating in debinding in manufacturing multilayer ceramic capacitors. The resin component in the binder is oxidized through the combustion, producing carbon dioxide (carbon monoxide) and water. The carbon dioxide (carbon monoxide) and water leave as gases. The production of carbon dioxide (carbon monoxide) is accelerated to allow debinding in a relatively short period of time and at relatively low temperatures for, for example, a high content of a binder or a high-molecular-weight binder.

When the conductive paste for electrode formation contains a metal oxide having a higher level of standard Gibbs energy of formation than carbon dioxide or carbon monoxide in the Ellingham diagram, the oxidation of the carbon in the resin component in the binder into carbon dioxide (carbon monoxide) is accompanied by the reduction of the metal oxide into a metal element. In the debinding step, the carbon dioxide (carbon monoxide) produced through the oxidation leaves the conductive paste for electrode formation. The metal element produced through the reduction remains in the conductive paste for electrode formation. The residual metal element serves as a conductive material for electrode layers together with the metal particles.

The metal oxide may have, in the Ellingham diagram, a higher level of standard Gibbs energy of formation than carbon dioxide or carbon monoxide at a temperature of 500 to 1000° C. In other words, the metal oxide may not constantly have a higher level of standard Gibbs energy of formation than carbon dioxide or carbon monoxide throughout the range of 500 to 1000° C. The oxidation of the binder is accelerated when the heating in the debinding step is performed at a temperature, within the range of 500 to 1000° C., at which the metal oxide has a higher level of standard Gibbs energy of formation than carbon dioxide or carbon monoxide. When the heating temperature in the debinding step is predetermined for other factors, a metal oxide that has a higher level of standard Gibbs energy of formation than carbon dioxide or carbon monoxide at the predetermined temperature may be selected and added to the conductive paste for electrode formation as a metal oxide additive. One metal oxide may be used alone, or a mixture of two or more different metal oxides may be used.

The drawing is an Ellingham diagram. Examples of metal oxides that have, in the Ellingham diagram, a higher level of standard Gibbs energy of formation than carbon dioxide or carbon monoxide at a temperature of 500 to 1000° C. include: CuO (copper(II) oxide), Cu2O (copper(I) oxide), NiO (nickel(II) oxide), CoO (cobalt(II) oxide), Co3O4 (cobalt(II,III) oxide), FeO (iron(II) oxide), Fe2O3 (iron(III) oxide), SnO (tin(II) oxide), SnO2 (tin(IV) oxide), and ZnO (zinc oxide). CuO, Cu2O, NiO, CoO, and Co3O4 have a higher level of standard Gibbs energy of formation than carbon dioxide or carbon monoxide throughout the range of 500 to 1000° C. FeO and Fe2O3 have, in the range of 500 to 1000° C., a lower level of standard Gibbs energy of formation than carbon dioxide and carbon monoxide at 500 to 700° C. and a higher level of standard Gibbs energy of formation than carbon dioxide and carbon monoxide at 700 to 1000° C. Fe2O3 has, in the range of 500 to 1000° C., a lower level of standard Gibbs energy of formation than carbon dioxide and carbon monoxide at 500 to 600° C. and a higher level of standard Gibbs energy of formation than carbon dioxide and carbon monoxide at 600 to 1000° C. SnO and SnO2 have, in the range of 500 to 1000° C., a lower level of standard Gibbs energy of formation than carbon dioxide and carbon monoxide at 500 to 600° C. and a higher level of standard Gibbs energy of formation than carbon dioxide and carbon monoxide at 600 to 1000° C. ZnO has, in the range of 500 to 1000° C., a lower level of standard Gibbs energy of formation than carbon dioxide and carbon monoxide at 500 to 950° C. and a higher level of standard Gibbs energy of formation than carbon dioxide and carbon monoxide at 950 to 1000° C.

Although the content of the metal oxide additive varies depending on the metal oxide and the binder used, the content of the metal oxide additive may be 0.005 to 5 mol %, or specifically, 0.01 to 0.5 mol %, as a percentage of the oxide to the metal particles. When the content exceeds 5 mol %, the metal oxide and the metal particles form an alloy that sinters at a lower temperature than the metal particles alone. A lower sintering temperature causes oversintering of electrodes in the debinding step and a firing step. When the content is less than 0.005 mol %, the acceleration of the oxidation may be insufficient.

CuO has the highest level of standard Gibbs energy of formation. The use of CuO may cause extra accelerated oxidation, thus causing breaks and other defects in the multilayer ceramic capacitors. When the heating temperature is, for example, lower than 700° C., CoO may be used rather than CuO. When the heating temperature is higher than or equal to 700° C., FeO or SnO may be used.

Solvent

The solvent may be any solvent with the metal particles, the binder, and the metal oxide additive being dispersible or soluble and not affecting the dielectric tape. Examples of the solvent include terpineols, such as α-terpineol, cyclohexanone, diethylene glycol monobutyl ether acetate, and dihydroterpineol acetate. One such solvent may be used alone, or a mixture of two or more different solvents may be used.

Although the content of the solvent varies depending on the components used, the content of the solvent may be 30 to 80 mass % inclusive, or specifically, 40 to 70 mass % inclusive, of the conductive paste for electrode formation.

Other Additives

In one or more embodiments of the present disclosure, the conductive paste for electrode formation may contain an additive in addition to the components described above. Examples of the additive include a dispersant, a viscosity modifier, a plasticizer, and an adhesion improver.

In manufacturing multilayer ceramic capacitors, the conductive paste for electrode formation according to one or more embodiments of the present disclosure can be used to accelerate the combustion (oxidation) of the binder in the debinding step. This allows use of a high content of a high-molecular-weight binder, thus allowing electrode layers and dielectric layers to be thinner. The multilayer ceramic capacitors can thus be miniaturized.

In one or more embodiments of the present disclosure, debinding includes heating, in a reducing atmosphere at 500 to 1000° C., a stack of layers of unfired dielectric tape and layers of electrode patterns with the conductive paste for electrode formation alternately stacked on one another. The accelerated combustion (oxidation) allows debinding at a temperature and in a duration of heating similar to those with known techniques when a high content of a high-molecular-weight binder is used for forming thinner layers. When a normal binder is used, this allows debinding at a lower temperature and in a shorter duration of heating than with known techniques.

In another embodiment, the conductive paste for electrode formation contains a dielectric material in addition to the metal particles, the binder, the metal oxide additive, and the solvent.

Dielectric Material

The dielectric material may be, for example, a material used for dielectric layers in multilayer ceramic capacitors. A multilayer ceramic capacitor is obtained by debinding a stack of layers of unfired dielectric tape and layers of electrode patterns of the conductive paste for electrode formation alternately stacked on one another and then firing the debound stack. The dielectric tape and the electrode patterns shrink at different shrinkage rates during firing. A larger difference in the shrinkage rate may cause, for example, breaks and delamination in the multilayer ceramic capacitor, thus decreasing the yield. The conductive paste for electrode formation preliminarily containing a dielectric material used for the dielectric layers reduces the difference in the shrinkage rate between the dielectric tape and the electrode patterns, thus reducing the decrease in the yield.

The dielectric material is to reduce the difference in the shrinkage rate between the dielectric tape and the electrode patterns. Thus, various known materials for dielectric layers may be used. Examples of the dielectric material include a strontium titanate powder, a barium titanate powder, a barium strontium titanate powder, a $Ba_{1-x}Ca_xTiO_3$ (X=0.01 to 0.1) or $Ba_{1-x}Sr_xTiO_3$ (X=0.01 to 0.1) powder, which contains a dissolved alkaline earth element, such as calcium or strontium, in barium, and a $Ba_{1-x}Ca_xTi_{1-y}ZrO_3$ (X=0.01 to 0.1, y=0.05 to 0.5) powder, which contains dissolved calcium in the barium titanate site and dissolved zirconium in the titanium site. The dielectric material may be the same as the dielectric material (common material) used for the dielectric layers in the multilayer ceramic capacitors to be manufactured using the conductive paste for electrode formation. When the dielectric material used for the dielectric layers is, for example, barium titanate, the dielectric material contained in the conductive paste for electrode formation may also be a barium titanate powder.

Although the content of the dielectric material varies depending on the dielectric material used, the content of the dielectric material may be substantially 0.5 to 40 mass % inclusive, or specifically, 5 to 20 mass % inclusive, of the metal particles.

A method for manufacturing the conductive paste for electrode formation will now be described. The manufacturing method described below is an example. The conductive paste for electrode formation may be manufactured with other methods.

The metal particles are dispersed in the solvent with a dispersant to prepare metal slurry. The binder is added to the metal slurry to a predetermined solid concentration and a predetermined viscosity. Separately from the metal slurry, the metal oxide additive is dispersed in the solvent with a dispersant to prepare accelerator slurry. The binder is added to the accelerator slurry to a predetermined solid concentration and a predetermined viscosity. The metal slurry and the accelerator slurry are mixed together to a predetermined solid concentration and a predetermined viscosity to obtain the conductive paste for electrode formation.

To obtain a conductive paste for electrode formation containing a dielectric material, the dielectric material may be preliminarily added to the accelerator slurry.

A method for manufacturing multilayer ceramic capacitors will now be described. The manufacturing method described below is an example. The multilayer ceramic capacitors may be manufactured with other methods in which the conductive paste for electrode formation according to one or more embodiments of the present disclosure is used.

Dielectric slurry containing a ceramic powder, an additive, and a dispersant is prepared. The binder is added to the dielectric slurry to a predetermined solid concentration and a predetermined viscosity. The dielectric slurry is shaped on a carrier film to prepare dielectric tape. An electrode pattern is printed on the dielectric tape with the conductive paste for electrode formation according to one or more embodiments of the present disclosure to prepare a patterned dielectric film. Patterned dielectric films are stacked on one another and pressed to obtain a stack. The stack is cut into pieces, which are debound in a reducing atmosphere. The debound pieces are fired in a reducing atmosphere. The resulting capacitor bases may be re-oxidized and barreled as appropriate. External electrodes are formed on the capacitor bases. The surfaces of the external electrodes are plated to obtain multilayer ceramic capacitors.

EXAMPLES

Conductive pastes for electrode formation were prepared with the metal oxides of CuO (example 1), $Co_3O_4$ (example 2), $Fe_2O_3$ (example 3), $SnO_2$ (example 4), and ZnO (example 5) as metal oxide additives. The composition of the conductive paste for electrode formation in example 1 is as follows. In a comparative example, a conductive paste for electrode formation containing no metal oxide additive was prepared.

Metal particles: 500 g of nickel powder (with a mean particle size of 200 nm)
Binder: 25 g of polyvinyl butyral
Metal oxide additive: 3.39 g of CuO
Dielectric material: 50 g of barium titanate powder (with a mean particle size of 20 nm)
Solvent: 500 g of dihydroterpineol acetate The content of the metal particles was 40 mass % of the entire paste. The content of the binder was 5 mass % of the metal particles. The content of the metal oxide additive (CuO) was 0.5 mol % of the metal particles. The content of the dielectric material was 10 mass % of the metal particles. The content of the solvent was 100 mass % of the metal particles. In examples 2 to 5, the content of the metal oxide additive was also 0.5 mol % of the metal particles.

The resulting conductive pastes for electrode formation were used to prepare multilayer ceramic capacitors containing the dielectric material being barium titanate. In debinding, the heating temperatures of 600, 800, and 950° C. were used for the conductive pastes for electrode formation. The conditions other than the heating temperatures in debinding were the same in manufacturing the multilayer ceramic capacitors.

After 0.5 g of each set of multilayer ceramic capacitors was measured, 1.5 g of an accelerator (Cu) was added. The resulting mixture was heated to 1200° C. with a radio-frequency heater. The carbon content of the generated gas was measured with a carbon analyzer. The measured carbon content is the amount of residual carbon in the multilayer ceramic capacitors and is attributed to unburned (unoxidized) binder residue left after debinding. Table 1 shows the measured amounts (mass %) of residual carbon.

TABLE 1

|  | 600° C. | 800° C. | 950° C. |
|---|---|---|---|
| Example 1 | 0.057 | 0.039 | 0.014 |
| Example 2 | 0.104 | 0.042 | 0.016 |
| Example 3 | 0.135 | 0.035 | 0.016 |
| Example 4 | 0.134 | 0.033 | 0.013 |
| Example 5 | 0.132 | 0.064 | 0.025 |
| Comparative example | 0.133 | 0.068 | 0.029 |

With CuO (example 1) or $Co_3O_4$ (example 2) used as the metal oxide additive, the amount of residual carbon was smaller than in the comparative example at all of the debinding temperatures of 600, 800, and 950° C. With $Fe_2O_3$ (example 3) or $SnO_2$ (example 4), the amount of residual carbon was substantially the same as in the comparative example at the debinding temperature of 600° C., but was smaller than in the comparative example at the debinding temperature of 800 or 950° C. In the Ellingham diagram, $Fe_2O_3$ and $SnO_2$ have a lower level of standard Gibbs energy of formation than carbon dioxide and carbon monoxide at 500 to 700° C. and a higher level of standard Gibbs energy of formation than carbon dioxide or carbon monoxide at 700 to 1000° C. $Fe_2O_3$ and $SnO_2$ are thus ineffective at 600° C. and effective at 800 and 950° C. ZnO has a higher level of standard Gibbs energy of formation than carbon dioxide or carbon monoxide at 950 to 1000° C. and thus are effective at 950° C.

The present disclosure may be implemented in the following forms.

In one or more embodiments of the present disclosure, a conductive paste for electrode formation contains metal particles, a binder, a metal oxide additive, and a solvent. The metal oxide additive includes a metal oxide having, in an Ellingham diagram, a higher level of standard Gibbs energy of formation than carbon dioxide or carbon monoxide at a temperature of 500 to 1000° C.

In one or more embodiments of the present disclosure, the conductive paste for electrode formation contains the metal oxide additive that accelerates the combustion of the binder resin. This allows use of the binder for thinner layers. The multilayer ceramic capacitors can thus be miniaturized.

The invention claimed is:

1. A ceramic capacitor comprising:
an internal electrode formed of a conductive paste on a dielectric, the conductive paste comprising:
metal particles; and
a metal oxide additive;
wherein the metal oxide additive includes a metal oxide having, in an Ellingham diagram, a higher level of standard Gibbs energy of formation than carbon dioxide or carbon monoxide at a temperature of 500 to 1000° C., and
the metal oxide additive includes two or more metal oxides.

2. The ceramic capacitor according to claim 1, wherein a content of the metal oxide additive is 0.005 to 5 mol % as a percentage of an oxide to the metal particles.

3. The ceramic capacitor according to claim 1, further comprising:
a dielectric material.

4. The ceramic capacitor according to claim 1, wherein a content of the metal particles is 20 to 70 mass % of an entirety of the conductive paste for forming internal electrodes of a ceramic capacitor.

5. The ceramic capacitor according to claim 1, wherein a content of the binder is 0.5 to 20 mass % inclusive of the metal particles.

6. The ceramic capacitor according to claim 1, wherein the metal oxide additive is at least one selected from CoO (cobalt(II) oxide), $Co_3O_4$ (cobalt(II,III) oxide), FeO (iron(II) oxide), $Fe_2O_3$ (iron(III) oxide), SnO (tin(II) oxide), $SnO_2$ (tin(IV) oxide) and ZnO (zinc oxide).

7. A debinding method for use in manufacture of a ceramic capacitor, the method comprising:
preparing an internal electrode of the ceramic capacitor by heating, in a reducing atmosphere at 500 to 1000° C., a stack of layers of unfired dielectric tape and layers of electrode patterns with a conductive paste alternately stacked on one another, wherein the conductive paste comprises:
metal particles;
a binder;
a metal oxide additive; and
a solvent,
wherein the metal oxide additive includes a metal oxide having, in an Ellingham diagram, a higher level of standard Gibbs energy of formation than carbon dioxide or carbon monoxide at a temperature of 500 to 1000° C., and
the metal oxide additive includes two or more metal oxides.

* * * * *